US006822795B2

(12) United States Patent
Lai

(10) Patent No.: US 6,822,795 B2
(45) Date of Patent: Nov. 23, 2004

(54) DYNAMIC IMAGE DEVICE WITH DIFFRACTIVE OPTICAL ELEMENT

(76) Inventor: Kuo-Yen Lai, No. 58-8, Ma-Yuan Li, Chu-Pei, Hsin-Chu 302 (TW)

( * ) Notice: Subject to any disclaimer, the term of this patent is extended or adjusted under 35 U.S.C. 154(b) by 6 days.

(21) Appl. No.: 10/340,892

(22) Filed: Jan. 13, 2003

(65) Prior Publication Data

US 2004/0136072 A1 Jul. 15, 2004

(51) Int. Cl.[7] .................................................. G02B 5/18
(52) U.S. Cl. ........................ 359/567; 359/566; 359/558; 428/29
(58) Field of Search ................................ 359/566, 567, 359/558, 563, 1–2, 478

(56) References Cited

U.S. PATENT DOCUMENTS 4,017,158 A * 4/1977 Booth ......................... 359/567

* cited by examiner

*Primary Examiner*—Leo Boutsikaris
(74) *Attorney, Agent, or Firm*—H. C. Lin, Patent Agent

(57) ABSTRACT

Invisible different monochromatic images are inscribed in a diffractive optical element. Each of the images appears when a specific light source is on and image disappears when the specific light is off. The light sources for the different monochromatic images are spaced at different positions with respect to the diffractive optical element. A dynamic image is produced by time-varying and electronically controlling the intensity and on/off of the different light sources.

10 Claims, 9 Drawing Sheets

DYNAMIC IMAGE DEVICE WITH DIFFRACTIVE OPTICAL ELEMENT

BACKGROUND OF THE INVENTION (1) Field of the Invention

This invention relates to Diffractive Optical Element (DOE), particularly to a specific dynamic image device using a DOE. This invention is suitable for applications such as stage lighting, decorative lighting, foot light, hand-held lighting rod, scenery light, underwater light, sidewalk light, indoor decoration light, outdoor light, etc.

(2) Brief Description of Related Art

Traditional dynamic image display system using LED panel which is expensive and complicated. Traditional DOE is used to display a static image as shown in FIG. 4. FIGS. 1–3 are three examplified invisible images.

FIG. 1 shows a first invisible image. An invisible image F is imbedded in a diffractive optical element 10. A seesaw display plank 12 is supported by a fulcrum 14. In the position shown in FIG. 1, the A end of the seesaw plank is tilted upward and the B end is tilted downward.

FIG. 2 shows a second invisible image. A second position of the display panel 12, where the seesaw plank 12 is in a horizontal position with A end and the B end at the same level.

FIG. 3 shows a third invisible image. A third position of the display panel 12, where the seesaw plank 12 has the B end tilted above the A end. This position corresponds to a third color.

FIG. 4 shows a prior art optical system utilizing diffractive optical elements 10 shown in FIGS. 1, 2, 3 to produce only a static image.

Different invisible images are inscribed in the DOE by laser tool, but are not changeable or programmable once inscribed.

SUMMARY

An object of this invention is to produce a specific dynamic imaging system, where the image can have motion. Another object of this invention is to produce a dynamic color display. Still another object of this invention is to provide a specific dynamic imaging system, which can be maintained easily.

This invention uses a DOE to create a simple specific image display system. These objects are achieved by embodying a plurality of different invisible images in the diffractive optical element DOE. Different images can be displayed when emitted by monochromatic light source at different positions. Dynamic image can be displayed by controlling the light intensity and on/off of the light sources at different positions. This invention is a simple and inexpensive specific dynamic image device which can be used in decoration or business advertisements where only few dynamic images can satisfy.

DETAILED DESCRIPTION OF THE INVENTION

Figure 1:
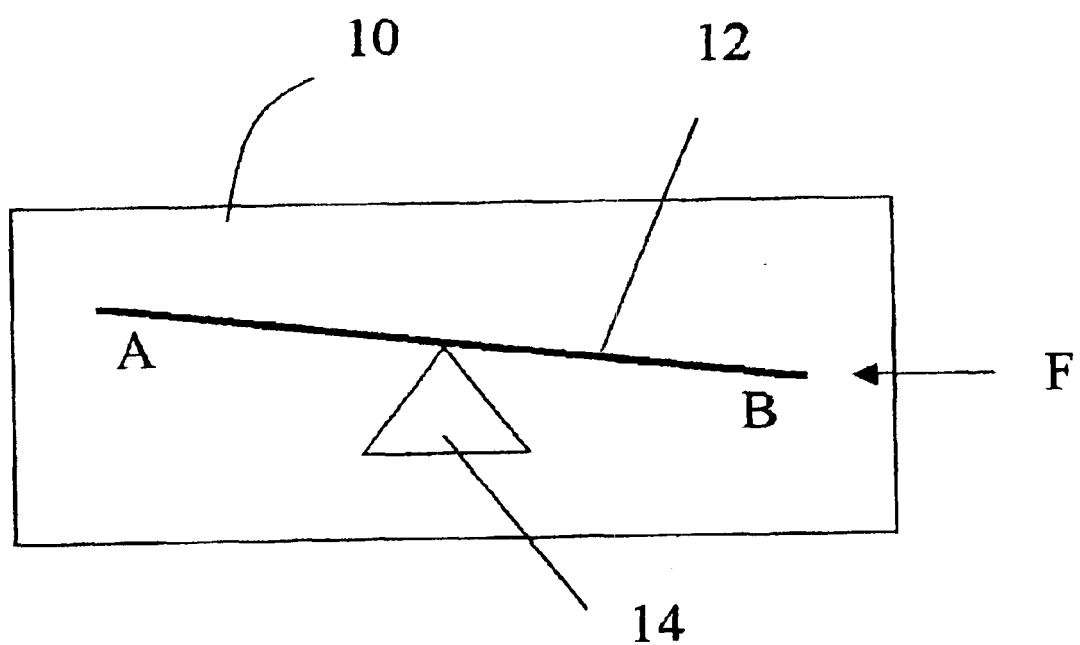
FIG. 1 shows a first invisible image.
Figure 2:
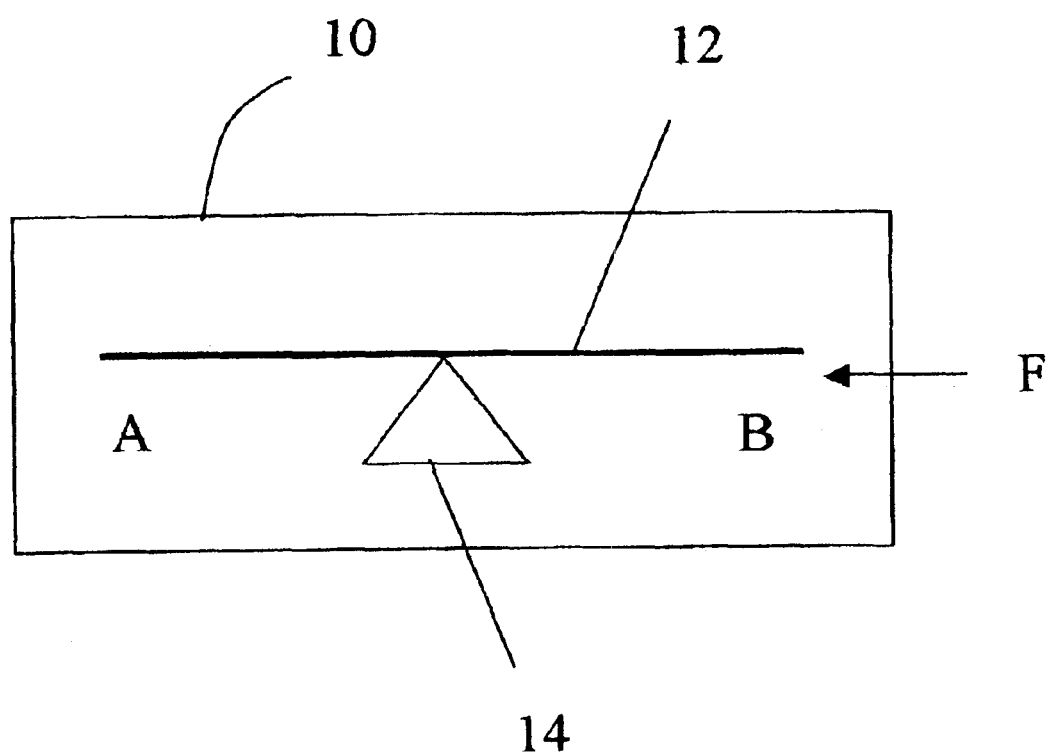
FIG. 2 shows a second invisible image.
Figure 3:
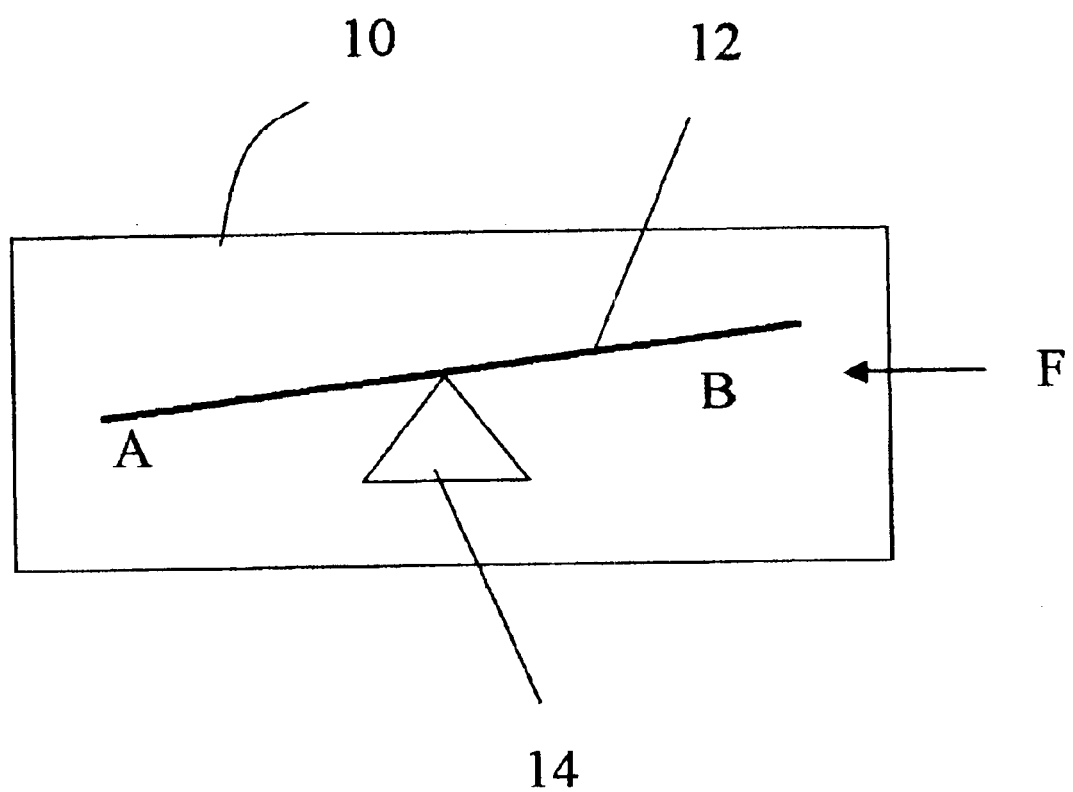
FIG. 3 shows a third invisible image.
Figure 4:
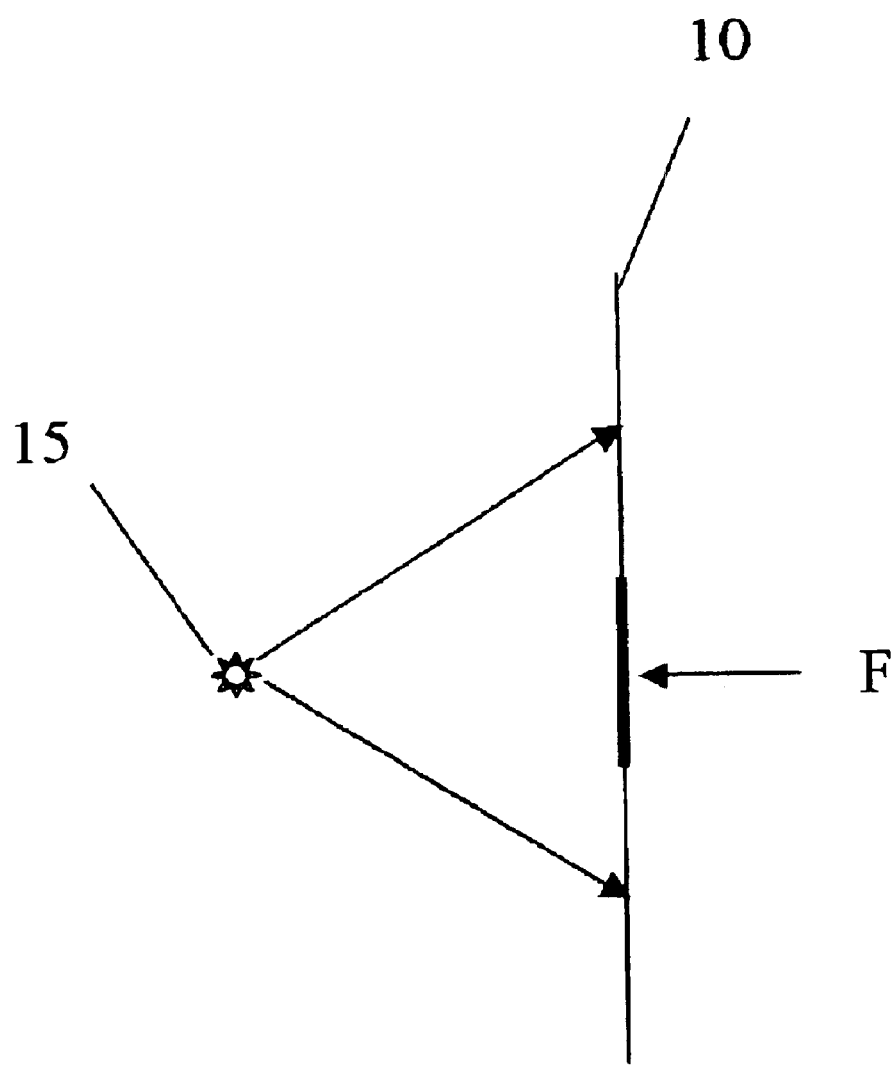
FIG. 4 shows a prior art DOE system combining the systems in FIGS. 1, 2, 3 to produce a single image.
Figure 5:
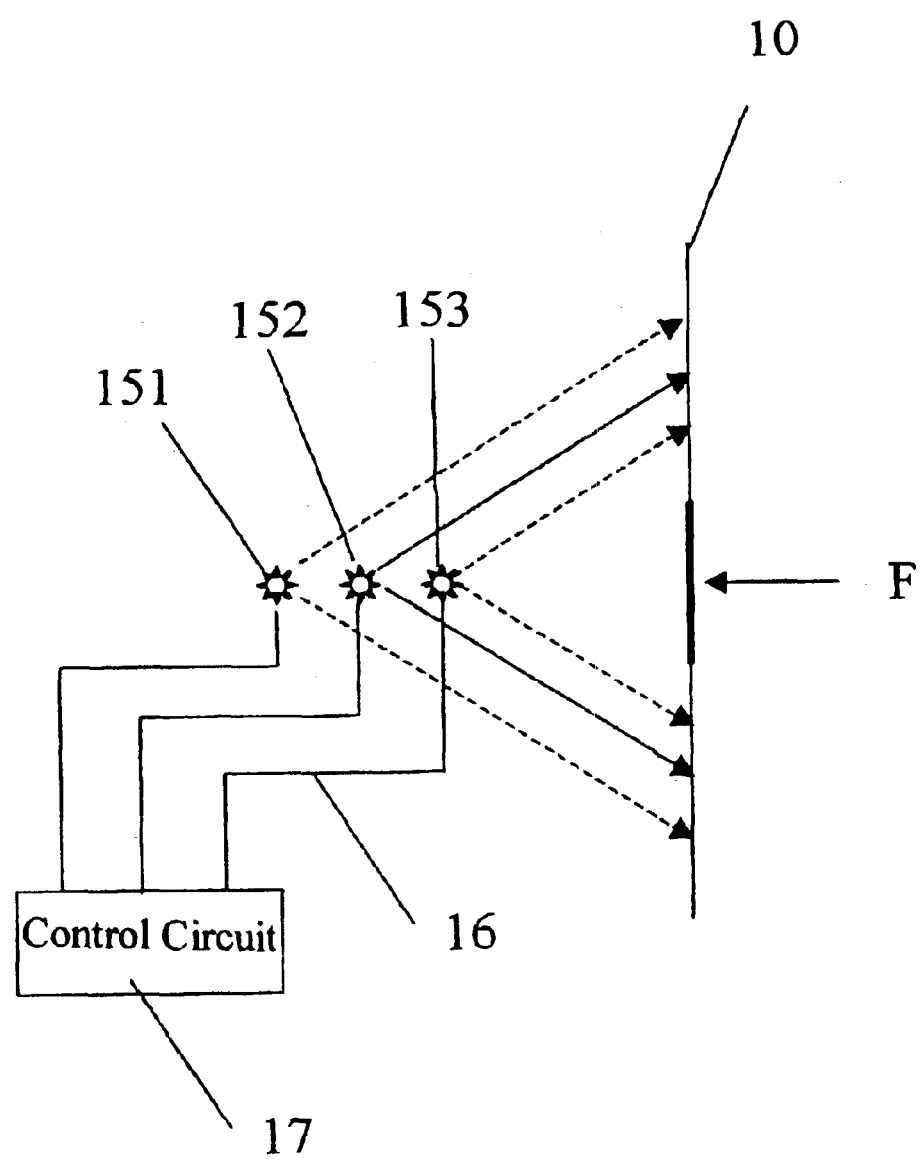
FIG. 5 shows the first embodiment of the present invention, where three light sources are placed at different distances perpendicular to the DOE.

FIG. 5 shows three monochromatic light sources 151, 152, 153 projecting on to a diffractive optical element 10. The different light sources are spaced at different distances from the diffractive element 10. Due to different focal distances for different image, specific image appears corresponding to a specific light source. When any one of the light sources 151, 152, 153 is energized, the image appearing on the other side of the DOE appears as static image F as that produced from the prior art FIGS. 1, 2, and 3. When the three monochromatic light sources 151, 152, 153 exercise different on-and-off lighting or different intensity sequence, the image at the other side of the DOE 10 produces a dynamic image. A control circuit 17 feeds by wires 16 to the three monochromatic light sources 151, 152, 153 to control the time-varying on/off operation or the light intensity.

The three monochromatic light sources 151, 152, 153 can be single color to produce specific single dynamic image. The three monochromatic light sources 151, 152, 153 can be the three primary color light sources: red (R), green (G) and blue(B) and provide dynamic color image. The three color light sources 151, 152, 153 can be obtained from a light emitting diode, a laser, etc.

Figure 6:
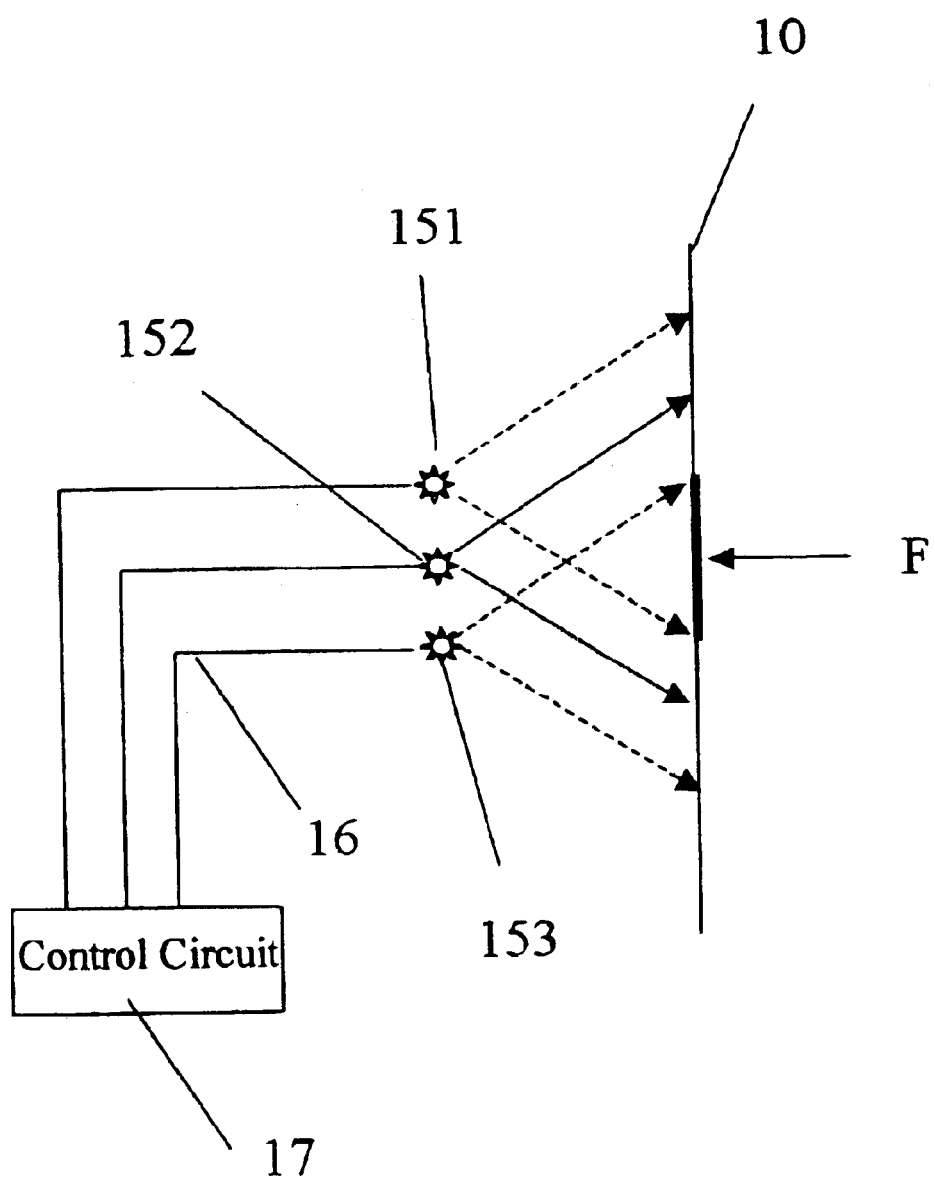
FIG. 6 shows a second embodiment of the present invention, where three light sources are placed different horizontal positions with respect to the DOE.

FIG. 6 shows a second embodiment of the present invention. Three monochromatic light sources 151, 152 and 153 are aligned in parallel with the DOE plane 10 to produce an image F at the other side of the DOE. As in FIG. 5, the different color light sources can be controlled from a time-varying control circuit 17 through wires 16.

Figure 7:
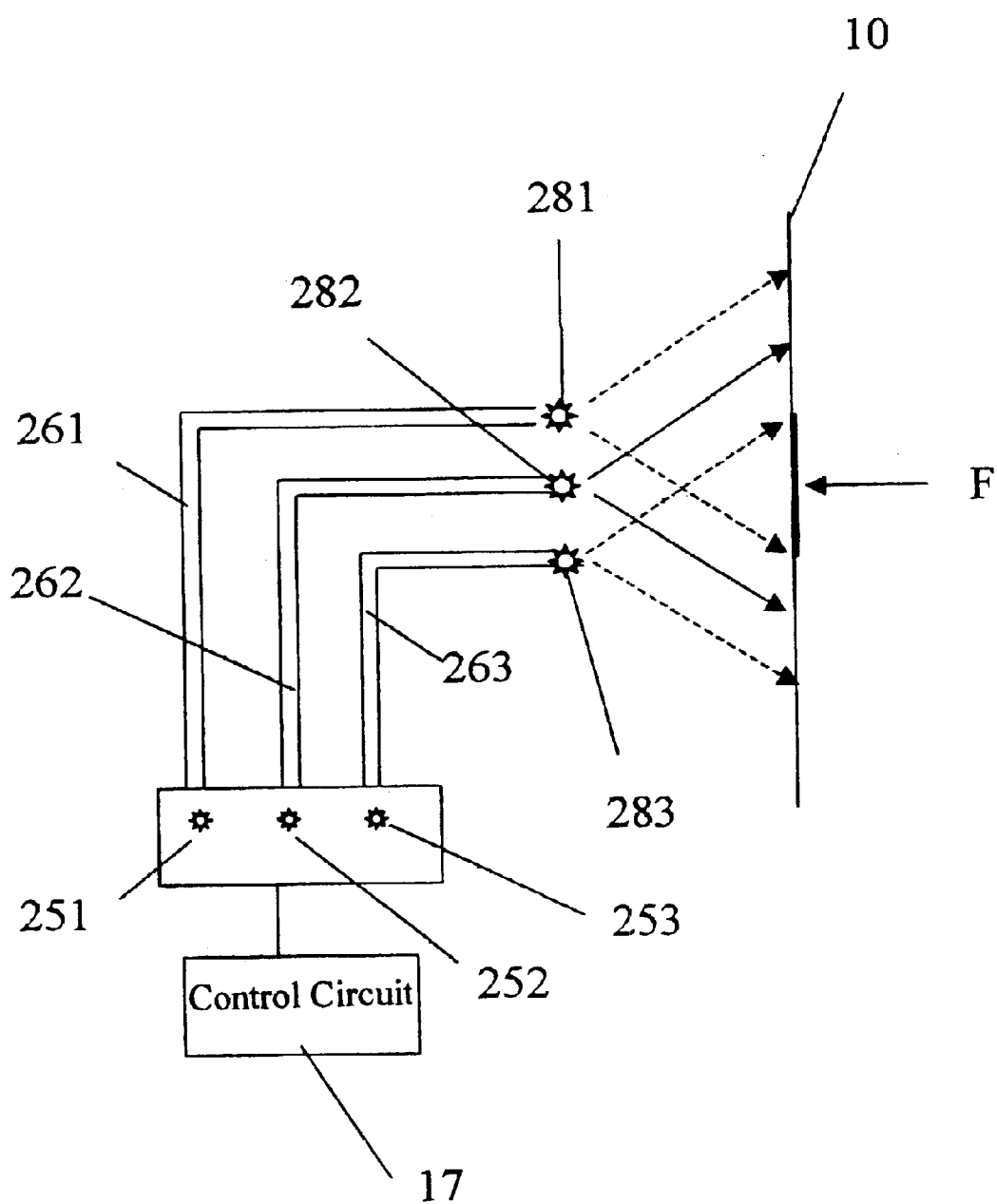
FIG. 7 shows a third embodiment of the present invention, where the light sources in FIG. 6 are fed from optical fibers.

FIG. 7 shows a third embodiment of the present invention. The different light sources 281, 282, 283 are aligned in parallel to the DOE plane 10 similar to that in FIG. 6. These light sources 281, 282, 283 are fed by optical fibers 261, 262, 263, respectively, which are energized in turn by primary light sources 251, 252, 253. The primary light sources 251, 252, 253 are controlled by control circuit 17 to produce time-varying on/off or varying intensity of the dynamic color image F.

Figure 8:
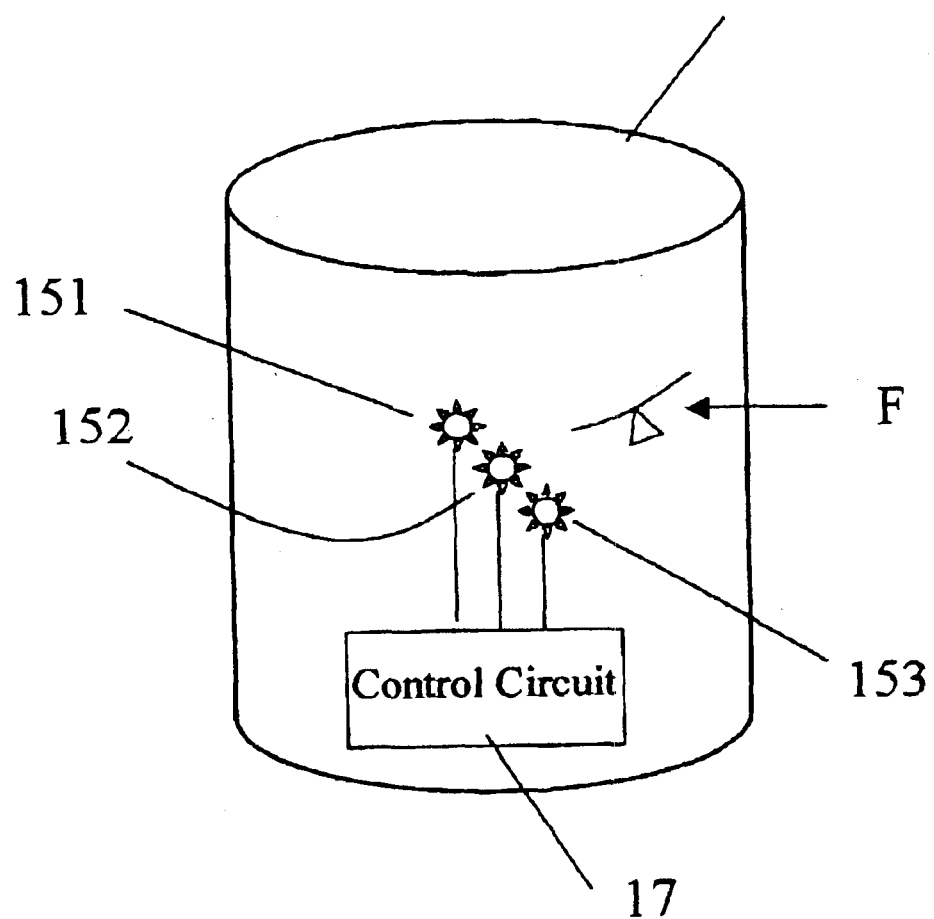
FIG. 8 shows a fourth embodiment of the present invention, where the DOE is shaped as a cylinder.

FIG. 8 shows a fourth embodiment of the invention. The DOE surface is a cylinder 101 with the three monochromatic light sources 151, 152, 153 placed in offset positions inside the cylinder 101 together with the control circuit 17. The cylindrical DOE surface 101 can also be made wavy, corrugated, regular surface or irregular surface to produce time-varying dynamic images.

Figure 9:
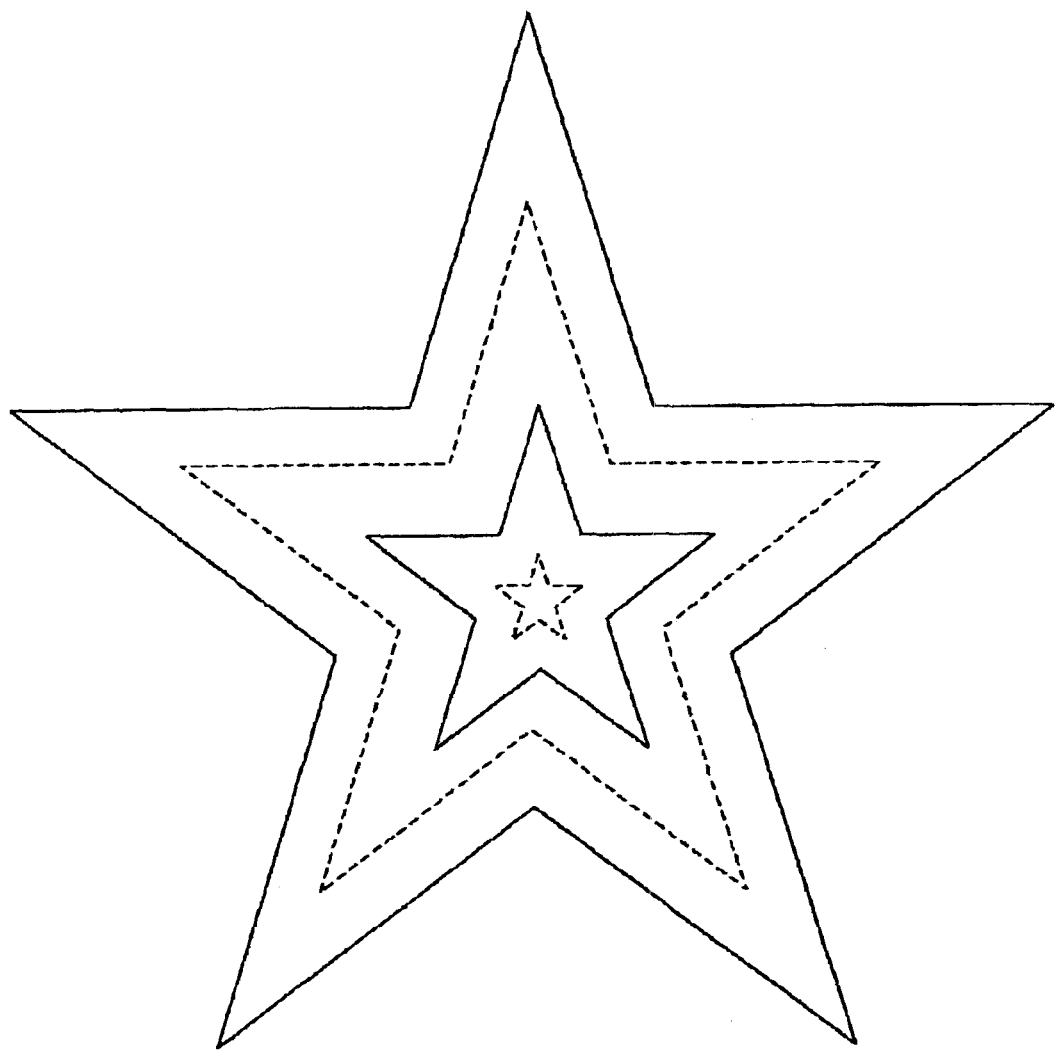
FIG. 9 shows a system for expanding and shrinking a lighting display dynamically.

FIG. 9 shows a fifth embodiment of the present invention. In addition to back-and-forth, rotating, vibrating images, the dynamic image F can also reproduce shrinking and expanding dynamic images. The images F produced by the present technique are not limited to be planar, but can also be 3-dimensional. FIG. 9 shows four stars of different sizes, each lighted by a single color source. The lighted patterns can appear as a receding time-varying dynamic star or an expanding star. The four single color stars can be programmed to shine in a dynamic pattern.

An alternative design for the multiple light sources is to use single light source with moving mechanism to move back-and-forth, move up-and-down, to rotate . . . etc. and to exhibit similar specific dynamic image display.

While particular embodiments have been described, it will be apparent to those skilled in the art that various modifications can be made in the embodiments without departing from the spirit of the present invention. Such modifications are all within the scope of the present invention.

What is claimed is:

1. A specific dynamic display system, comprising:
   a diffractive optical element embedded with different invisible images, each of which displays on said diffractive optical element when a specific light passes;
   more than one monochromatic light sources, each placed at a different position with respect to said diffractive optical element; and
   a control circuit to control the light intensity and on/off of said more than one light sources to produce a time-varying dynamic said image.

2. The specific dynamic optical system as described in claim 1, wherein there are three monochromatic light sources.

3. The specific dynamic optical system as described in claim 2, wherein the three monochromatic light sources are red, green and blue.

4. The specific dynamic optical system as described in claim 1, wherein said monochromatic light sources are aligned perpendicular to the surface of the plane of the diffractive optical element.

5. The specific dynamic optical system as described in claim 1, wherein the monochromatic light sources are aligned in parallel with the surface of the plane of the diffractive optical element.

6. The specific dynamic optical system as described in claim 1, wherein said monochromatic light sources are fed by optical fibers from a set of primary light sources.

7. The dynamic optical system as described in claim 1, wherein said diffractive optical element has a surface selected from the group consisting of flat surface and a cylindrical surface.

8. The specific dynamic optical system as described in claim 7, wherein said surface is selected from the group consisting of smooth, wavy, and corrugated surfaces.

9. The specific dynamic optical system as described in claim 1, further comprising additional said diffractive optical element being located in a three-dimensional object.

10. A specific dynamic display system, comprising:
    a diffractive optical element embedded with different invisible images, each of which displays on said diffractive optical element when a specific light passes,
    a monochromatic light source;
    a moving mechanism to move said light source with respect to said diffractive optical element; and
    a control circuit to control the light intensity and on/off of said light source to produce a time-varying dynamic said image.

* * * * *